US006447928B2

(12) United States Patent
Suitts (10) Patent No.: US 6,447,928 B2
(45) Date of Patent: Sep. 10, 2002

(54) PROCESS OF MANUFACTURING A CORE METAL INSERT (75) Inventor: Terry Robert Suitts, Englewood, OH (US)

(73) Assignee: The Gem City Engineering Company, Dayton, OH (US)

( * ) Notice: Subject to any disclaimer, the term of this patent is extended or adjusted under 35 U.S.C. 154(b) by 0 days.

(21) Appl. No.: 09/732,284

(22) Filed: Dec. 7, 2000

Related U.S. Application Data (63) Continuation of application No. 09/164,290, filed on Oct. 1, 1998, now abandoned.

(51) Int. Cl.[7] .............................. B32B 3/02; B32B 3/24; B21D 28/24; E06B 7/22; E06B 7/232
(52) U.S. Cl. ....................... 428/573; 428/596; 428/600; 52/635; 52/670; 52/671
(58) Field of Search ................................. 428/573, 596, 428/600; 52/635, 670, 671; 29/611

(56) References Cited

U.S. PATENT DOCUMENTS

| | | |
|---|---|---|
| 3,167,825 A | 2/1965 | Zoller |
| 3,371,447 A | 3/1968 | Ruff et al. |
| 3,706,173 A | 12/1972 | Taylor |
| 3,774,274 A | 11/1973 | Jury |
| 4,196,546 A | 4/1980 | Bright |
| 4,396,685 A | 8/1983 | Jury |
| 4,424,976 A | 1/1984 | Hayashi |
| 4,745,665 A | 5/1988 | Hilsenbeck |
| 4,959,081 A | 9/1990 | Mathellier |
| 4,982,529 A | 1/1991 | Mesnel |
| 5,199,142 A | 4/1993 | Davis |
| 5,249,353 A | 10/1993 | Kranz |
| 5,302,466 A | 4/1994 | Davis et al. |
| 5,651,218 A | 7/1997 | Bright et al. |

FOREIGN PATENT DOCUMENTS

EP 0 441 287 A1 2/1991

OTHER PUBLICATIONS

Marketing brochure entitled, "CMI Continuous Metal Insert", printed by The Gem City Engineering Company, P.O. Box 1295, Dayton, Ohio 45401. No date.
Blueprint entitled, "Continuous Metal Insert: Diamond Ladder", dated Sep. 16, 1996.

Primary Examiner—Deborah Jones
Assistant Examiner—Jason Savage
(74) Attorney, Agent, or Firm—Maginot, Moore & Bowman (57) ABSTRACT A core metal insert for use in a sealing assembly is disclosed. The core metal insert is manufactured by a process which includes the step of cutting a plurality of left lateral outermost inboard slits and a plurality of right lateral outermost inboard slits in a metal blank so as to create a slitted metal blank. The process of manufacturing the core metal insert further includes the step of coining the slitted metal blank so that the core metal insert is manufactured with (i) a plurality of left lateral outermost inboard gaps defined therein, (ii) a plurality of right lateral outermost inboard gaps defined therein, (iii) a left lateral coin-formed bridge which is positioned within each left lateral outermost inboard gap of the plurality of left lateral outermost inboard gaps and which divides each left lateral outermost inboard gap into a first left lateral outermost inboard subgap and a second left lateral outermost inboard subgap, each of the first left lateral outermost inboard subgap and the second left lateral outermost inboard subgap extends through the core metal insert, and (iv) a right lateral coin-formed bridge which is positioned within each right lateral outermost inboard gap of the plurality of right lateral outermost inboard gaps and which divides each right lateral outermost inboard gap into a first right lateral outermost inboard subgap and a second right lateral outermost inboard subgap, each of the first right lateral outermost inboard subgap and the second right lateral outermost inboard subgap extends through the core metal insert.

21 Claims, 5 Drawing Sheets

Fig. 8

PROCESS OF MANUFACTURING A CORE METAL INSERT

This application is a continuation of application Ser. No. 09/164,290, filed on Oct. 1, 1998 now abandoned.

BACKGROUND OF THE INVENTION

The present invention relates generally to a core metal insert which is used in a sealing assembly of an automobile or the like. The present invention also relates generally to a method of manufacturing such a core metal insert.

Sealing assemblies are commonly used in automobiles in order to seal areas adjacent to the doors, windows, and trunk covers. The sealing assemblies typically include a metallic inner member and an elastomeric outer member. The metallic inner member, commonly referred to as a "core metal insert," provides structural integrity to the sealing assembly, while the elastomeric outer member provides the sealing assembly with its ability to seal against objects such as doors, windows or truck covers.

One challenge when designing a sealing assembly is to obtain a core metal insert that has a configuration which facilitates long-term attachment of the elastomeric material to the core metal insert whereby durability of the sealing assembly is achieved. Note that the sealing assembly is subjected to repeated contact with a movable object such as an automobile door, window or truck cover. Thus, durability of the sealing assembly is important goal.

It would also be desirable to obtain long-term attachment of the elastomeric material to the core metal insert without the need to chemically treat the core metal insert prior to attaching the elastomeric material to the core metal insert. Eliminating a manufacturing step in the process of making the sealing assembly would reduce the cost of the sealing assembly.

Another challenge when designing a sealing assembly is to obtain a core metal insert which is relatively light weight yet still provides structural integrity to the sealing assembly. Reducing weight of components of an automobile such as a sealing assembly reduces fuel consumption of the automobile.

Yet another challenge when designing a sealing assembly is to obtain a core metal insert that has a configuration which facilitates bending of the core metal insert during manufacture of the sealing assembly. In particular, obtaining a core metal insert which is relatively easy to bend during manufacture of the sealing assembly reduces manufacturing costs since less exotic bending equipment may be used to bend the core metal insert to a desired shape prior to attachment of the elastomeric material to the core metal insert.

SUMMARY OF THE INVENTION

According to one embodiment of the present invention, there is provided a core metal insert for use in a sealing assembly. The core metal insert is manufactured by a process including the step of cutting a plurality of inboard slits in a metal blank so as to create a slitted metal blank. The process of manufacturing the core metal insert further includes the step of coining the slitted metal blank so that the core metal insert is manufactured with (i) a plurality of inboard gaps defined therein, and (ii) a coin-formed bridge which is positioned within each inboard gap of the plurality of inboard gaps and which divides each inboard gap of the plurality of inboard gaps into a first inboard subgap and a second inboard subgap, each of the first inboard subgap and the second inboard subgap extends through the core metal insert.

According to another embodiment of the present invention, there is provided a method of manufacturing a core metal insert which is adapted to be used in a sealing assembly. The method includes the steps of (i) cutting a plurality of inboard slits in a metal blank so as to create a slitted metal blank, and (ii) coining a swath in the slitted metal blank so that the slitted metal blank is expanded to create the core metal insert with a plurality of inboard gaps defined therein. Each inboard gap of the plurality of inboard gaps extends from a left lateral inboard gap end to a right lateral inboard gap end. The swath is oriented relative to the plurality of inboard gaps such that, when the core metal insert is viewed in a plan view, (i) the swath forms an intersection with each inboard gap of the plurality of inboard gaps, and (ii) the swath is spaced apart from each of the left lateral inboard gap end and the right lateral inboard gap end.

Yet according to another embodiment of the present invention, there is provided a core metal insert for use in a sealing assembly, the core metal insert being manufactured by a process including the steps of (i) cutting a plurality of inboard slits in a metal blank so as to create a slitted metal blank, and (ii) coining a swath in the lifted metal blank so that the slitted metal blank is expanded to create the core metal insert with a plurality of inboard gaps defined therein. The coining step includes the step of displacing a quantity of metal of the slitted metal blank so as to create a coin-formed bridge with the quantity of metal which (A) is positioned within each of the plurality of inboard gaps, and (B) divides each inboard gap of the plurality of inboard gaps into a first inboard subgap and a second inboard subgap. Each of the first inboard subgap and the second inboard subgap extends through the core metal insert.

According to another embodiment of the present invention, there is provided a core metal insert for use in a sealing assembly, the core metal insert being manufactured by a process including the step of cutting a plurality of left lateral outermost inboard slits and a plurality of right lateral outermost inboard slits in a metal blank so as to create a slitted metal blank. The process of manufacturing the core metal insert further includes the step of coining the slitted metal blank so that the core metal insert is manufactured with (i) a plurality of left lateral outermost inboard gaps defined therein, (ii) a plurality of right lateral outermost inboard gaps defined therein, (iii) a left lateral coin-formed bridge which is positioned within each left lateral outermost inboard gap of the plurality of left lateral outermost inboard gaps and which divides each left lateral outermost inboard gap into a first left lateral outermost inboard subgap and a second left lateral outermost inboard subgap, each of the first left lateral outermost inboard subgap and the second left lateral outermost inboard subgap extends through the core metal insert, and (iv) a right lateral coin-formed bridge which is positioned within each right lateral outermost inboard gap of the plurality of right lateral outermost inboard gaps and which divides each right lateral outermost inboard gap into a first right lateral outermost inboard subgap and a second right lateral outermost inboard subgap, each of the first right lateral outermost inboard subgap and the second right lateral outermost inboard subgap extends through the core metal insert.

One object of the present invention is to provide a new and useful core metal insert.

Another object of the present invention is to provide an improved core metal insert.

Still another object of the present invention is to provide a new and useful method of manufacturing a core metal insert.

Yet another object of the present invention is to provide an improved method of manufacturing a core metal insert.

Still another object of the present invention is to provide a core metal insert that has a configuration which facilitates long-term attachment of the elastomeric material to the core metal insert whereby durability of the sealing assembly is achieved.

Another object of the present invention is to provide a core metal insert which is configured so that it does not need to be chemically treated prior to attaching the elastomeric material to the core metal insert and yet still enables long-term attachment of the elastomeric material to the core metal insert.

Yet another object of the present invention is to provide a core metal insert which is relatively light weight yet still provides structural integrity to a sealing assembly.

Still another object of the present invention is to provide a core metal insert that has a configuration which facilitates bending of the core metal insert during manufacture of the sealing assembly.

Other objects and benefits of the present invention can be discerned from the following description and accompanying drawings.

DESCRIPTION OF THE PREFERRED EMBODIMENT

While the invention is susceptible to various modifications and alternative forms, a specific embodiment and method thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 1:
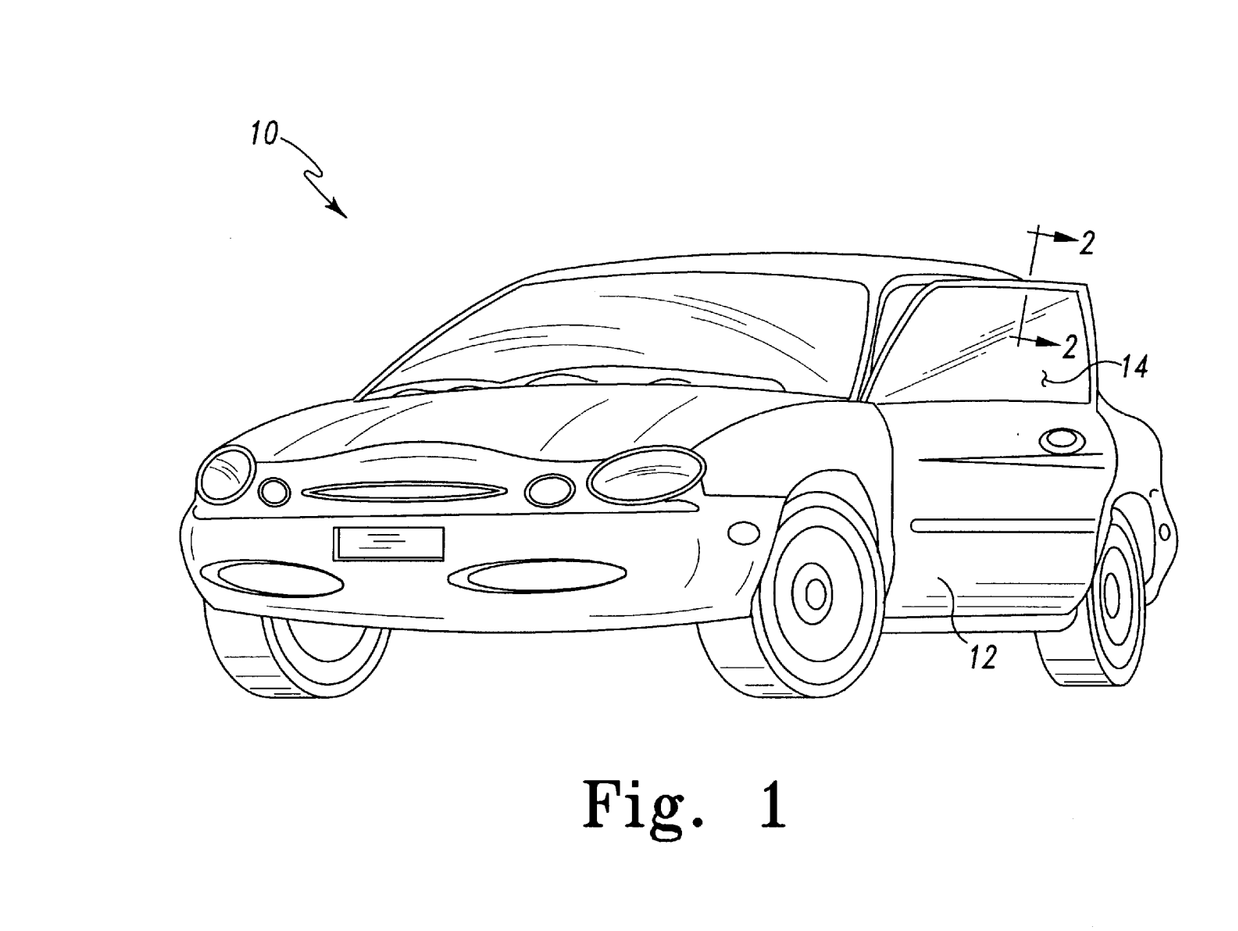
FIG. 1 is a perspective view of an automobile which incorporates the features of the present invention therein.

Referring now to the drawings, FIG. 1 shows an automobile 10 which incorporates features of the present invention therein. The automobile 10 includes a driver door 12 having a window 14 which is able to be moved between a raised position and a lowered position within the door 12. Note that the window 14 is shown in the raised position in FIG. 1.

Figure 2:
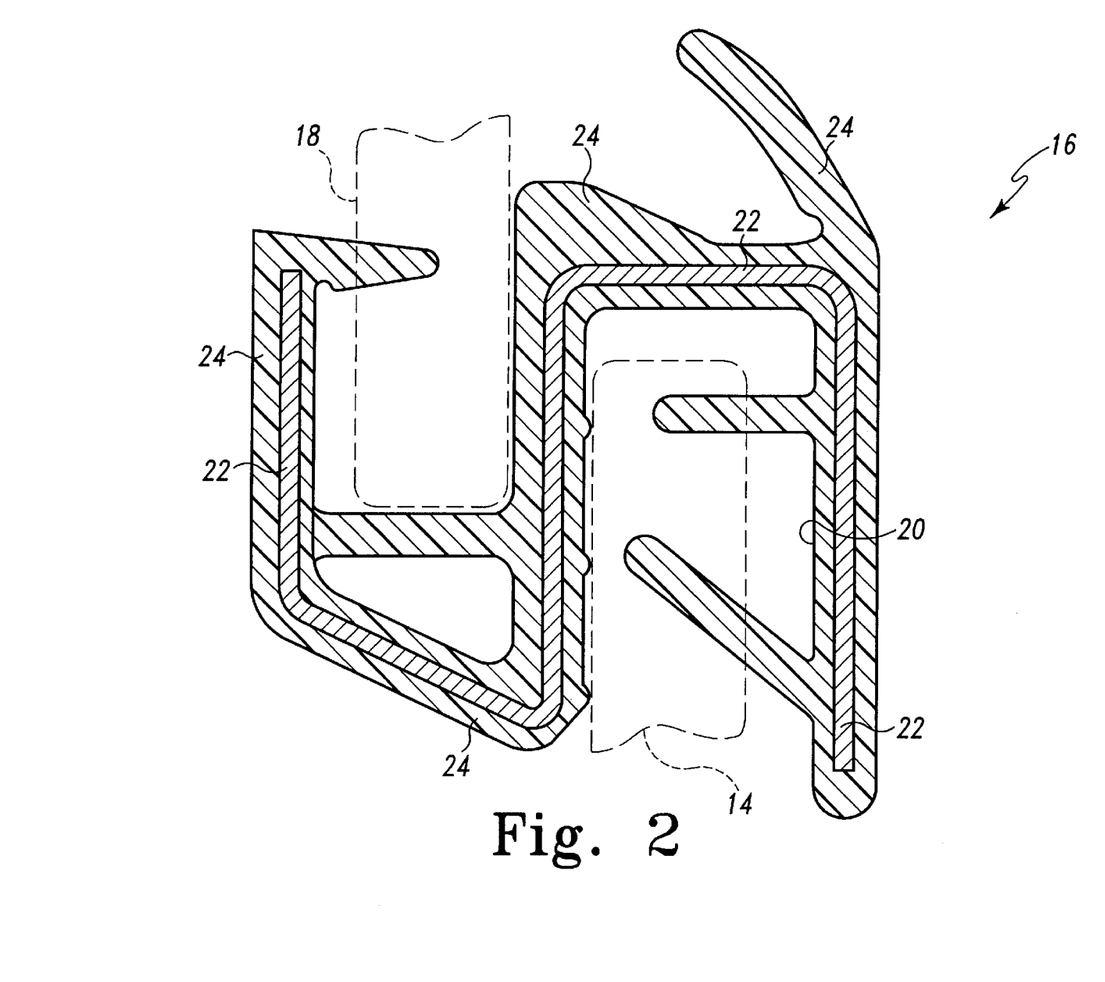
FIG. 2 is a cross sectional view of a sealing assembly of the automobile of FIG. 1 which is taken along the line 2—2 of FIG. 1 as viewed in the direction of the arrows, with FIG. 2 also showing a door frame and a window of the automobile of FIG. 1 in phantom for clarity of description.

The door 12 includes a sealing assembly 16 as shown in FIG. 2. During manufacture of the automobile 10, the sealing assembly 16 is secured to a frame 18 of the door 12. The sealing assembly 16 includes a channel 20 which receives an upper end of the window 14 therein when the window is located in its raised position as shown in FIG. 2.

The sealing assembly 16 includes a core metal insert 22 and an elastomeric material 24 which are secured together. The core metal insert 22 is preferably made from steel. Moreover, types of elastomeric materials which may be used in the present invention is rubber or synthetic resin. Types of rubbers which may be appropriate for use with the present invention is sponge rubber, EDPM rubber, or polyvinyl chloride rubber.

Figure 3:
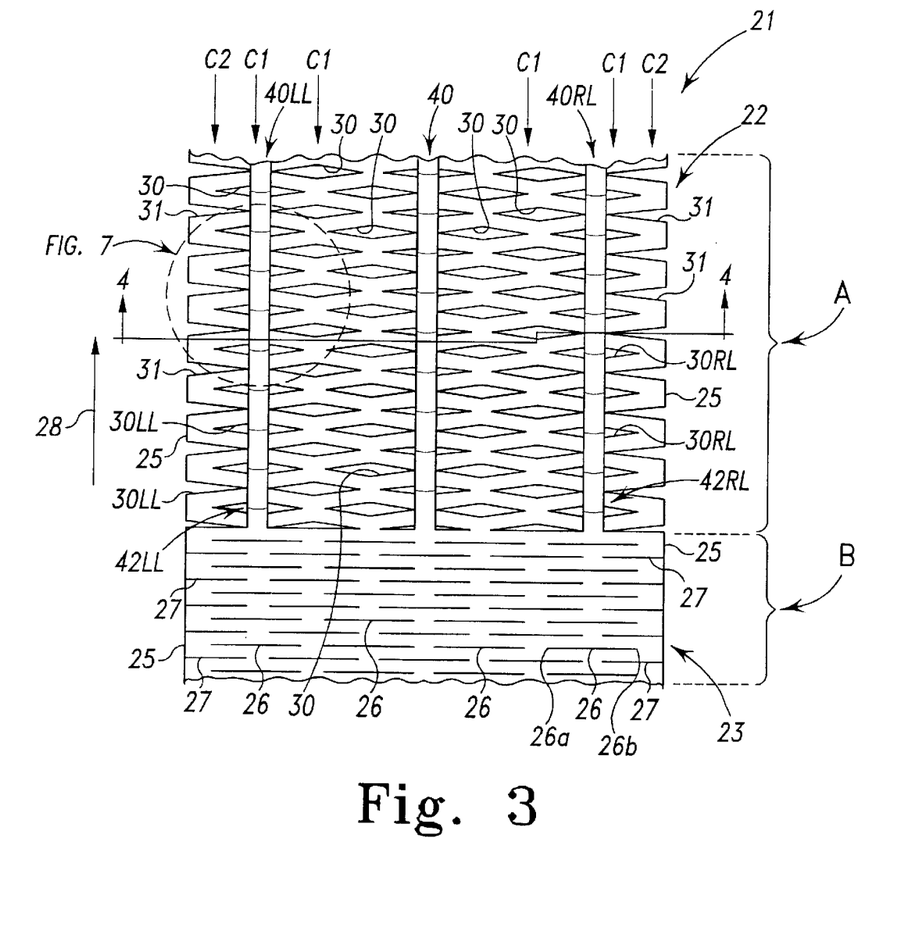
FIG. 3 is a plan view (or top elevational) of a metal segment which is in-process of being manufactured in accordance with a method of the present invention, with (i) the portion A comprising a completed segment of the core metal insert which is used in the sealing assembly of FIG. 2, and (ii) the portion B comprising an in-process segment of a slitted metal blank.

FIG. 3 shows a metal segment 21 which is in-process of being manufactured into the core metal insert 22. In particular, a portion A of the metal segment 21 comprises a completed segment of the core metal insert 22, while a portion B of the metal segment 21 comprises an in-process segment of a slitted metal blank 23. It should be appreciated that the slitted metal blank 23 is a continuous strip of metal which may be rolled and have an extremely long length (e.g. 20,000 feet).

The slitted metal blank 23 (see portion B of FIG. 3) includes a plurality of inboard slits 26 and a plurality of outboard slits 27 defined therein. Note that the slits 26, 27 are created in the slitted metal blank 23 as a result of a cutting or slitting operation. The slits 26, 27 remain in the slitted metal blank 23 until the slitted metal blank is subjected to a coining operation. The plurality of slits 26, 27 are substantially linear in shape and are oriented in a width-wise direction relative to a processing direction 28 (see also FIG. 5) of the core metal insert 22. The inboard slits 26 are spaced inward from each of the lateral ends 25 of the metal segment 21, while the outboard slits 27 are juxtaposed to at least one of the lateral ends 25 of the metal segment 21. Each of the inboard lateral slits extends continuously from a left lateral slit end 26a to a right lateral slit end 26b as shown in FIG. 3.

The core metal insert 22 (see portion A of FIG. 3) has a plurality of inboard gaps 30 defined therein. The outermost inboard gaps 30 are indicated with the designation "LL" or "RL" to signify if it is a left lateral outermost inboard gap 30LL or a right lateral outermost inboard gap 30RL. In order to provide meaning to the term "outermost" as it is used herein, it should be appreciated that there does no exist any inboard gaps 30 to the left in a width-wise direction of a left lateral outermost inboard gap 30LL. Moreover, it should be appreciated that there does no exist any inboard gaps 30 to the right in a width-wise direction of a right lateral outermost inboard gap 30RL. The designations "LL" and "RL" are used with other elements of the core metal insert 22 and such designations have a similar meaning to that described above with respect to the left lateral outermost inboard gap 30LL and the right lateral outermost inboard gap 30RL.

The core metal insert 22 further includes a plurality of leading leg portions 34 and a plurality of trailing leg portions 36. Each inboard gap 30 is defined collectively by one of the leading leg portions 34 and a respective one of the trailing leg portions 36. In particular, a respective leg portion pair 34, 36 collectively define an entire outer boundary of each inboard gap 30 (see e.g. FIG. 8). As a result, each of the inboard gaps 30 is spaced inward from each of the lateral ends 25. The plurality of inboard gaps 30 form a number of columns C1 as shown in FIG. 3. Each of the columns C1 of the inboard gaps 30 are oriented length-wise relative to the processing direction 28.

Figure 4:
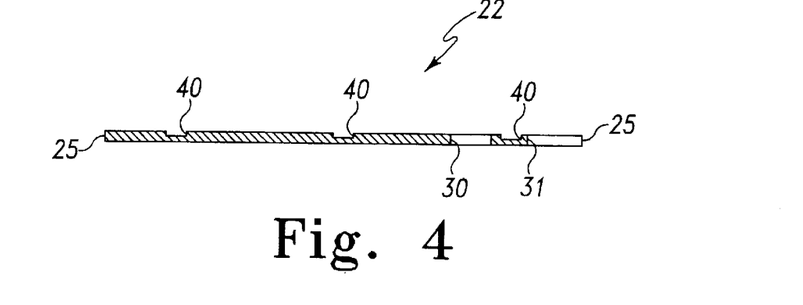
FIG. 4 is a cross sectional view of the core metal insert of FIG. 3 which is taken along the line 4—4 of FIG. 3 as viewed in the direction of the arrows.
Figure 6:
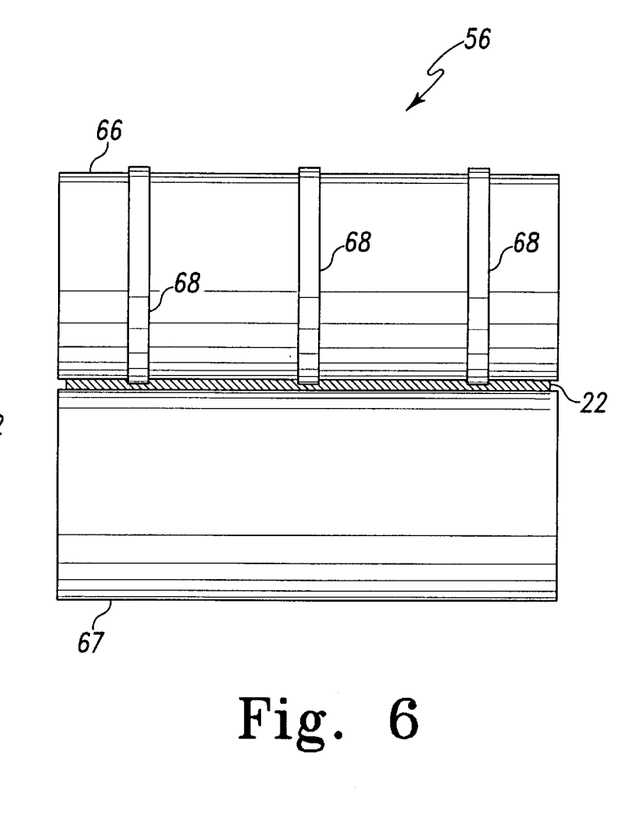
FIG. 6 is a cross sectional view which is taken along the line 6—6 of FIG. 5 as viewed in the direction of the arrows.

It should be noted that the sectional views shown in FIGS. 2 and 6 are taken at a location of the core metal insert 22 where no inboard gaps 30 or outboard gaps 31 are present. This is why each of the above-identified cross sectional views shows a continuous metal cross section along the entire width of the core metal insert 22. However, FIG. 4 does show an inboard gap 30 and an outboard gap 31 in cross section at the right lateral side of the drawing.

The core metal insert 22 (see portion A of FIG. 3) further has a plurality of outboard gaps 31. The outboard gaps are non-bounded by the metal of the core metal insert 22 and are juxtaposed to at least one of the lateral ends 25 of the metal segment 21 as shown in FIG. 3. More specifically, each of the outboard gaps 31 are open at a lateral end 25 as indicated at arrow 38 in FIG. 7. The plurality of outboard gaps 31 form a number of columns C2 as shown in FIG. 3. Each of the columns C2 of the outboard gaps 31 are also oriented length-wise relative to the processing direction 28.

The core metal insert 22 further includes a plurality of linear coin swaths 40. Each coin swath 40 is created in the slitted metal blank 23 as a result of the slitted metal blank being subjected to a coining process. As the slitted metal blank is coined to form the linear coin swaths 40, a quantity of metal is displaced so as to create a number of coin-formed bridges 42 each which is positioned in each inboard gap of certain columns of inboard gaps C1 as shown in FIG. 3. Each of the coin swaths 40 are linear in shape and are oriented in a length-wise direction relative to the processing direction 28. Note that the linear coin swaths 40 are perpendicularly oriented relative to the linear slits 26 of the slitted metal blank 23.

Figure 7:
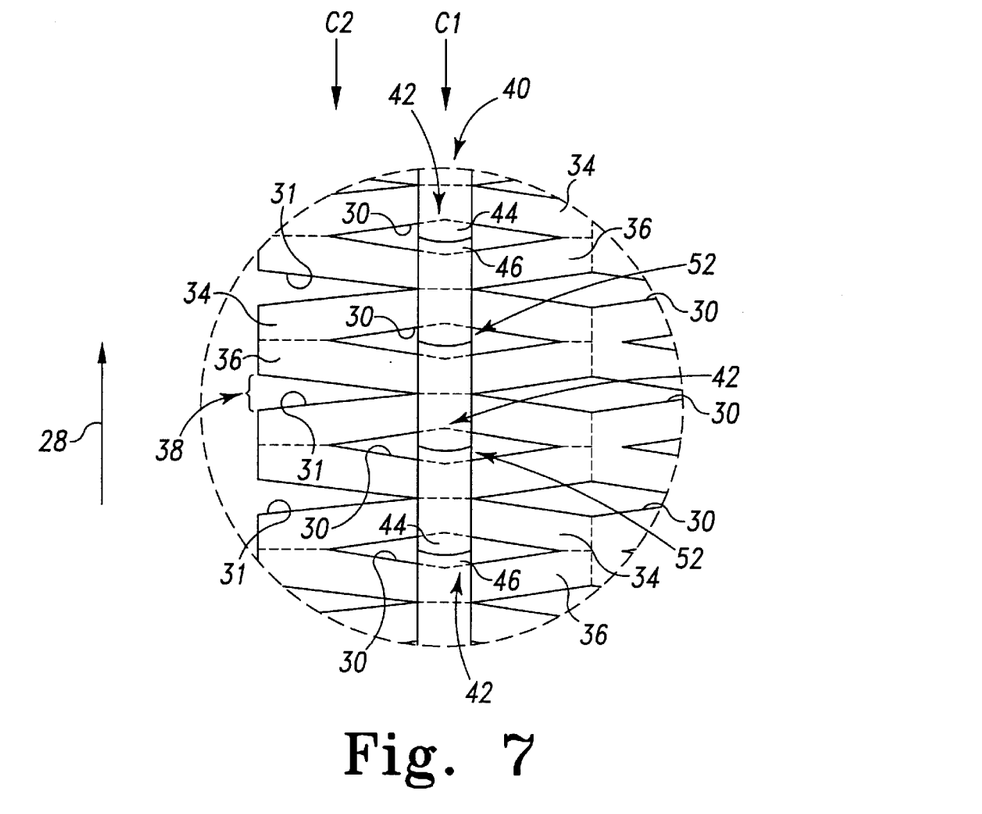
FIG. 7 is an enlarged view of a portion of FIG. 3 which is encircled and indicated as FIG. 7.
Figure 8:
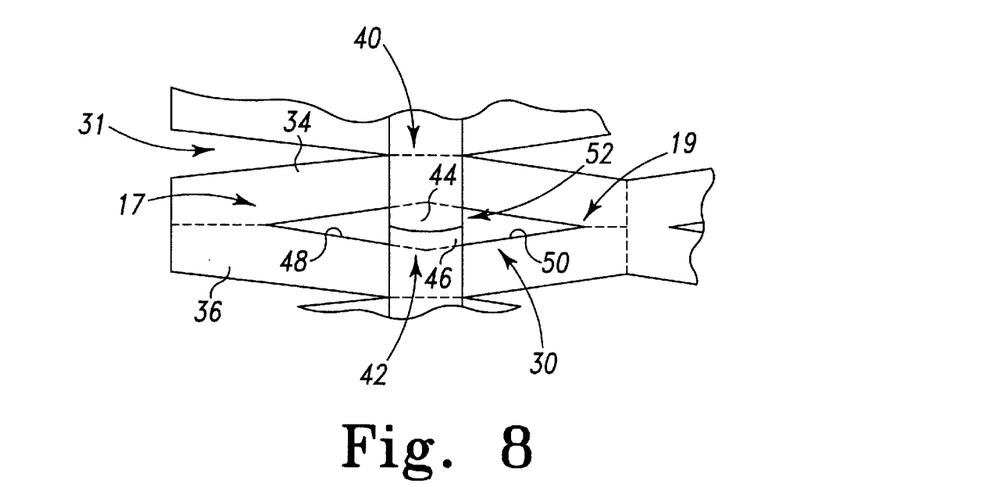
FIG. 8 is an enlarged view of a portion of FIG. 7 showing a leading leg portion and a respective trailing leg portion which collectively define an inboard gap which has been divided by a coin-formed bridge into a first inboard subgap and a second inboard subgap.

As shown in FIGS. 7 and 8, each coin-formed bridge 42 includes a leading bridge portion 44 which extends into a respective inboard gap 30 from a respective leading leg portion 34. Similarly, each coin-formed bridge 42 further includes a trailing bridge portion 46 which extends into a respective inboard gap 30 from a respective trailing leg portion 36. The leading bridge portion 44 contacts the trailing bridge portion 46 so that the coin-formed bridge 42 continuously extends from the leading leg portion 34 to the trailing leg portion as shown in FIGS. 7 and 8.

Each coin-formed bridge 42 divides a respective inboard gap 30 into a first inboard subgap 48 and a second inboard subgap 50 (see FIG. 8). Each subgap 48, 50 extends through the core metal insert 22 in a manner similar to the described with respect to gaps 30 and 31. This is an important aspect of the present invention since during manufacture of the sealing assembly 16, melted elastomeric material 24 flows through and becomes permanently located within each of the numerous subgaps 48 and 50, and thereafter adheres or bonds to itself so as to entrap the core metal insert 22 securely within the elastomeric material 24. The presence of a relatively large number of the subgaps 48, 50 defined within the core metal insert 22 functions to enhance the entrapment of the core metal insert 22 within the elastomeric material 24. This increases the durability of the sealing assembly 16. This increased durability is achieved even without chemically treating the core metal insert 22 prior to attaching or adhering the elastomeric material 24 to the core metal insert.

It should be noted that, when the core metal insert 22 is viewed in a plan view such as FIG. 3, the linear coin swaths 40 each forms or defines an intersection 52 with a respective inboard gap 30 as shown in FIGS. 7 and 8. The locations of the coin-formed bridges 42 defines the locations of the intersections 52.

Each of the inboard gaps 30 extends from a left lateral inboard gap end 17 to a right lateral inboard gap end 19 as shown in FIG. 8. Each of the coin swaths 40 is defined in the core metal insert 22 such that each swath 40 is spaced apart from each respective left lateral inboard gap end 17 and each respective right lateral inboard gap end 19 as shown in FIG. 8 (see also FIG. 7).

Figure 5:
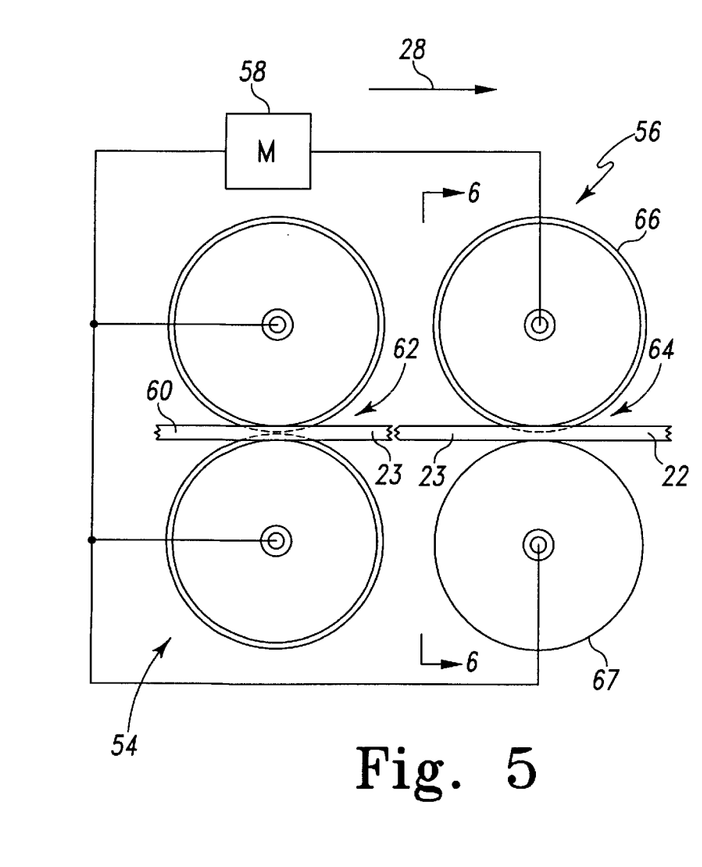
FIG. 5 is a schematic view of a first set of rollers which function to cut slits into a blank metal workpiece and a second set of rollers which function to coin the slitted blank metal workpiece so as to manufacture the core metal insert of FIG. 3 in accordance with a method of the present invention.

Turning now to FIGS. 5 and 6, there is shown a first set of rollers 54 and a second set of rollers 56. Each of the first set of rollers 54 and the second set of rollers 56 are driven by a motor 58. The first set of rollers 54 operate to perform a cutting or slitting process whereby slits 26 are cut into a blank metal plate. The first set of rollers 54 cuts or slits a metal blank 60 which is received into a nip 62 defined between the rollers 54. The output of the first set of rollers 54 is the slitted metal blank 23.

The second set of rollers 56 operate to perform a coining process on the slitted metal blank 23 whereby the slitted metal blank 23 is expanded to create the core metal insert 22 with the plurality of inboard gaps 30 and the plurality of outboard gaps 31 defined therein. The second set of rollers 56 functions to coin the slitted metal blank 23 which is received into a nip 64 defined between the rollers 56. The second set of rollers 56 also function to form coin swaths 40 in the slitted metal blank 23 thereby displacing a quantity of metal into certain of the plurality of inboard gaps 30 so as to create the plurality of coin-formed bridges 42 thereby forming the subgaps 48 and 50. The output of the second set of rollers 56 is the core metal insert 22.

The second set of rollers 56 include an upper roller 66 and a lower roller 67. The upper roller 66 includes a plurality of swath die members 68 which cooperate with the lower roller 67 to form the swaths 40 into the core metal insert 22.

It should be noted that, as shown in FIG. 3, the core metal insert 22 advantageously has a left lateral coin swath 40LL coined therein such that a number of left lateral coin-formed bridges 42LL are respectively positioned in each of the plurality left lateral outermost inboard gaps 30LL. Additionally, the core metal insert 22 advantageously has a right lateral coin swath 40RL coined therein such that a number of right lateral coin-formed bridges 42RL are respectively positioned in each of the plurality right lateral outermost inboard gaps 30RL. Coining the core metal insert 22 in such a manner provides for more even expansion of the core metal insert 22 in the processing direction 28.

While the invention has been described in detail in the drawings and foregoing description, the same is to be considered as illustrative and not restrictive in character, it being understood that only the preferred embodiments and methods have been shown and described and that all changes and modifications that come within the spirit of the invention are desired to be protected.

What is claimed is:

1. A core metal insert for use in a sealing assembly, said core metal insert being manufactured by a process including the steps of:

forming in a metal blank at least one inboard slit which extends continuously from a left lateral slit end to a right lateral slit end; and expanding said metal blank to create an inboard gap therein, said expanding step including the step of displacing a quantity of metal of said metal blank so as to create a bridge with said quantity of metal which (i) is positioned within said inboard gap, and (ii) divides said inboard gap into a first inboard subgap and a second inboard subgap, wherein said bridge is spaced apart from both said left lateral slit end and said right lateral slit end.

2. The core metal insert of claim 1, wherein each of said first inboard subgap and said second inboard subgap extends through said core metal insert.

3. The core metal insert of claim 1, wherein said expanding step further includes the step of forming a coin swath in said metal blank which traverses said at least one inboard slit so that said metal blank is expanded thereby creating said inboard gap.

4. The core metal insert of claim 3, wherein said coin swath which is formed in said metal blank is a linear coin swath.

5. The core metal insert of claim 1, wherein said inboard gap is defined by a leading leg portion and a trailing leg portion of said core metal insert which collectively define an entire outer boundary of said inboard gap.

6. The core metal insert of claim 5, wherein said bridge includes (i) a leading bridge portion which extends into said inboard gap from said leading leg portion, and (ii) a trailing bridge portion which extends into said inboard gap from said trailing leg portion.

7. The core metal insert of claim 6, wherein said leading bridge portion contacts said trailing bridge portion so that said bridge continuously extends from said leading leg portion to said trailing leg portion.

8. The core metal insert of claim 1, wherein:

said at least one inboard slit is oriented in a first direction, said expanding step includes the step of forming a linear coin swath in said metal blank, said linear coin swath is oriented in a second direction, and said first direction is substantially perpendicular to said second direction.

9. The core metal insert of claim 8, wherein:

said at least one inboard slit is oriented in a width-wise direction, and said linear coin swath is oriented in a length-wise direction.

10. A core metal insert for use in a sealing assembly, said core metal insert being manufactured by a process including the steps of:

forming at least one column of inboard slits in a metal blank so as to create a slitted metal blank, each inboard slit of said at least one column of inboard slits extending continuously from a respective left lateral slit end to a respective right lateral slit end; and forming a linear coin swath in said slitted metal blank which traverses each inboard slit of said at least one linearly aligned column of inboard slits so that said slitted metal blank is expanded to create a plurality of inboard gaps defined therein which are aligned in a column, wherein said linear coin swath is spaced apart from both said respective left lateral slit end and said respective right lateral slit end of each inboard slit of said at least one linearly aligned column of inboard slits during said linear coin swath forming step, and wherein said linear coin swath forming step includes the step of displacing a quantity of metal of said slitted metal blank so as to create a coin-formed bridge with said quantity of metal which (i) is positioned within each of said plurality of inboard gaps, and (ii) divides each inboard gap of said plurality of inboard gaps into a first inboard subgap and a second inboard subgap.

11. The core metal insert of claim 10, wherein each of said first inboard subgap and said second inboard subgap extends through said core metal insert.

12. The core metal insert of claim 10, wherein:

each of said plurality of inboard gaps is defined by a leading leg portion and a trailing leg portion of said core metal insert which collectively define an entire outer boundary of said respective inboard gap, said coin-formed bridge includes (i) a leading bridge portion which extends into said respective inboard gap from said leading leg portion, and (ii) a trailing bridge portion which extends into said inboard gap from said trailing leg portion, and said leading bridge portion contacts said trailing bridge portion so that said bridge continuously extends from said leading leg portion to said trailing leg portion.

13. The core metal insert of claim 10, wherein:

each of said plurality of inboard gaps is defined by a leading leg portion and a trailing leg portion which collectively define an entire outer boundary of said respective inboard gap, and said coin-formed bridge consists essentially of (i) a leading bridge portion that was formed entirely during said coin swath forming step, said leading bridge portion extending into said respective inboard gap from said leading leg portion, and (ii) a trailing bridge portion that was formed entirely during said coin swath forming step, said trailing bridge portion extending into said inboard gap from said trailing leg portion.

14. The core metal insert of claim 13, wherein said leading bridge portion contacts said trailing bridge portion so that said bridge continuously extends from said leading leg portion to said trailing leg portion.

15. A core metal insert for use in a sealing assembly, said core metal insert being manufactured by a process including the steps-of:

cutting a plurality of inboard slits in a metal blank so as to create a slitted metal blank, each of said plurality of inboard slits extending continuously from a respective left lateral slit end to a respective right lateral slit end; and coining said slitted metal blank so that said core metal insert is manufactured with (i) a plurality of inboard gaps defined therein which are aligned in a column, and (ii) a coin-formed bridge which is positioned within each inboard gap of said plurality of inboard gaps and which divides each inboard gap of said plurality of inboard gaps into a first inboard subgap and a second inboard subgap, each of said first inboard subgap and said second inboard subgap extends through said core metal insert, wherein said cutting step includes the step of forming at least one linearly aligned column of inboard slits, wherein said coining step includes the step of forming a linear coin swath which traverses each inboard slit of said at least one linearly aligned column of inboard slits, and wherein said linear coin swath is spaced apart from both said respective left lateral slit end and said respective right lateral slit end of each inboard slit of said at least one linearly aligned column of inboard slits during said linear coin swath forming step.

16. The core metal insert of claim 15, wherein each inboard gap of said plurality of inboard gaps is defined by a leading leg portion and a trailing leg portion of said core metal insert which collectively define an entire outer boundary of said each inboard gap.

17. The core metal insert of claim 16, wherein said coin-formed bridge includes (i) a leading bridge portion which extends into said inboard gap from said leading leg portion, and (ii) a trailing bridge portion which extends into said inboard gap from said trailing leg portion.

18. The core metal insert of claim 17, wherein said leading bridge portion contacts said trailing bridge portion so that said coin-formed bridge continuously extends from said leading leg portion to said trailing leg portion.

19. The core metal insert of claim 15, wherein said linear coin swath is oriented relative to said plurality of inboard gaps such that, when said core metal insert is viewed in a plan view, said linear coin swath forms an intersection with each inboard gap of said plurality of inboard gaps which are aligned in said column.

20. The core metal insert of claim 15, wherein: each of said plurality of inboard slits is oriented in a first direction, said linear coin swath is oriented in a second direction, and said first direction is substantially perpendicular to said second direction.

21. The core metal insert of claim 19, wherein:

each of said plurality of inboard slits is oriented in a width-wise direction, and said linear coin swath is oriented in a length-wise direction.

\* \* \* \* \*